UNITED STATES PATENT OFFICE.

HENRY V. DUNHAM, OF MOUNT VERNON, NEW YORK.

EDIBLE-OIL PREPARATION.

1,302,486.   Specification of Letters Patent.   Patented Apr. 29, 1919.

No Drawing.   Application filed November 9, 1918. Serial No. 261,800.

*To all whom it may concern:*

Be it known that I, HENRY V. DUNHAM, a citizen of the United States of America, residing at Mount Vernon, in the county of Westchester and State of New York, have invented certain new and useful Improvements in Edible-Oil Preparations, of which the following is a specification.

The present invention relates to the production of ingestible mixtures containing edible oils, in a solid stable condition, in which the taste of the oil is largely masked by the other ingredients present, and in which the oil is in an attenuated finely divided condition, the product containing the oil in such a condition that upon mixing the product with water at ordinary room temperatures the entire mixture completely emulsifies, producing a thorough mixture or emulsion which is stable under ordinary conditions for a reasonable length of time, whereby the oil is readily assimilable in the human digestive system, and the invention embraces both the process and the product thereof.

In carrying out the process forming one of the objects of this invention, I prepare a relatively concentrated solution of a proteid body and add thereto a suitable quantity of the oil which is to be employed, agitate the mixture sufficiently to produce an emulsion containing the oil in a finely divided condition, which emulsion I then pass through a suitable homogenizer, or otherwise treat the mixture to produce a completely homogeneous mixture of the solution of albuminous material and the oil, which mixture does not separate on standing, and which mixture is then dried under suitable conditions to preserve its ready solubility, after which the dried material may be pulverized.

In the dry condition the product will keep for long periods of time without deterioration, and the product can subsequently be mixed with water, for example, at ordinary temperature to produce a rather permanent emulsion without the separation of any of the oil. This emulsion can be allowed to stand several hours, or in some cases, for one or two days or even a week or more, without the separation of much of the oily material.

As examples of suitable oils for use in the production of a food product, I mention olive oil, nut oil, cotton-seed oil, soya bean oil, lard, oleo, either in their original condition or (especially with the more strong-tasting oils) after being subjected to a sufficient degree of hydrogenation to render the same less odoriferous and also less liable to rancidification. The invention is not restricted to these specific oils, but covers broadly any kind of ingestible oil.

As the preferred albuminous material to employ, casein treated as described below is by far the most suitable, as when using this material I can employ an amount of oil which will constitute up to two-thirds (or even slightly more) of the total weight of the finished product. Another fairly suitable albuminous material is egg, which may be employed either as raw egg, egg white, egg yolk or dried egg redissolved. In some instances, as where only a relatively small amount of oil is to be incorporated, concentrated milk or milk powder mixed with water may be employed.

As a specific example of the process, to which the claims of the present case are not limited, I give the following: 100 parts of casein are completely, or substantially completely, dissolved in 400 parts of water with the aid of enough alkali, such as sodium bicarbonate, to make a perfect solution, which solution may be either neutral or slightly alkaline to litmus paper. This solution may be filtered from any undissolved casein, and a small amount of suitable flavoring, or seasoning materials added. To this solution are added 200 parts of purified olive oil, and the mixture violently agitated to completely emulsify the oil. The emulsion is then passed through a homogenizer, under high pressure, say, 3500 to 6000 lbs., to completely homogenize the same. This mass is then dried in any suitable manner, for example, in a vacuum drier, and the resulting mixture is pulverized. The resulting product contains about 33% of casein and 66% of oil.

This product is stable, and (unless the particular oil used is relatively unstable) will keep for months in relatively air-tight packages (such as paraffined cartons). The mixture, when stirred up with cold water, forms a relatively stable emulsion, which can stand for several hours without separation of oil.

In adding seasoning or flavoring material to the casein solution or at any other stage of the process, it is obvious that the amount and character of such materials should depend upon the particular product to be produced. The product of the above specific example is especially suited for mixing with water to form a cream substitute, i. e., a material which can be added to coffee, tea, etc., in place of ordinary cream, or can be added to milk to enrich the same. Products of such character will usually require the addition of a small amount of common salt, and other agents, such as soluble phosphates, hypophosphites, lactates, citrates, malt or malt products, sugar, enzymes, and the like, or any one or more flavoring or seasoning agents may be added, depending on the strength and character of the flavor desired.

It is to be understood that the maximum temperature employed in the drying operation depends upon the particular materials under treatment, particularly the kind of albuminous material employed. This is especially important in connection with the use of eggs or egg white as the emulsifying liquid. The temperature must not be so high as to injure the albuminous material, or to decrease its solubility.

The proportions employed can be widely varied, thus, for example, I may use from a proportion of three parts of casein to one of oil, up to one part of casein to two or even more of oil.

I do not herein specifically claim the use of medicinal oils, or products thereby produced, such being covered in my copending cases 137,335, filed December 16, 1916, and 252,592, filed September 4, 1918, of which cases the present is in part a continuation.

I claim:

1. As an article of manufacture, a light, dry, relatively finely divided, intimate mixture comprising a soluble albuminous material and at least about half as much of an ingestible oil, said oil being disseminated in a finely divided state throughout the mixture to be largely masked therein, said albuminous materal being present in sufficient quantity to produce, upon mixing the product with water, an intimate, practically stable emulsion, largely free from strong oily taste or odor.

2. A process which comprises emulsifying an ingestible oil in a solution of a water-soluble albuminous material, the amount of oil not being materially less than half the amount of the said albuminous material, and the amount of such albuminous material in the solution being greater than the amount thereof in normal milk, homogenizing the emulsion and drying the product.

3. As a new article of manufacture, a substantially dry, relatively light, pulverulent mass comprising an edible fatty oil uniformly disseminated throughout a mass of dry particles of water-soluble alkali-casein, and which product, upon mixing with water, is capable of producing a cream-like emulsion.

4. A process which comprises dissolving casein with a little alkali to produce a substantially neutral solution, emulsifying a fatty edible oil therewith, homogenizing the mixture and drying the product at a temperature low enough to prevent injury of the casein.

In testimony whereof I affix my signature.

HENRY V. DUNHAM.